United States Patent Office 2,973,356
Patented Feb. 28, 1961

2,973,356

21-FLUORO-9α-HALO-STEROIDS OF THE PREGNANE SERIES

Josef E. Herz and Josef Fried, New Brunswick, N.J., assignors to Olin Mathieson Chemical Corporation, New York, N.Y., a corporation of Virginia No Drawing. Filed May 16, 1956, Ser. No. 585,155

8 Claims. (Cl. 260—239.55)

This invention relates to the synthesis of valuable steroids; and has for its objects the provision of (I) an advantageous process of preparing steroids of the pregnane (including the pregnene and pregnadiene) series having a 21-fluoro substituent, a 9-alpha-halogen substituent and an 11-keto or 11-beta-hydroxy substituent; (II) certain new compounds useful themselves as physiologically-active steroids; and (III) certain new steroids useful in the preparation of said physiologically-active steroids.

The process of this invention essentially comprises: (a) interacting a 21-alkanesulfonyloxy (or 21-chloro or bromo) steroid of the pregnane series having a 9-beta, 11-beta-epoxy substituent with potassium fluoride to form the corresponding 21-fluoro derivative; (b) converting the latter into the corresponding 9-alpha-halo-11-beta-hydroxy derivative by treatment with a hydrogen halide; and (c), if desired, oxidizing the 9-alpha-halo-11-beta-hydroxy derivative to its 9-alpha-halo-11-keto derivative. An alternative process within the purview of this invention involves the direct conversion of a 21-alkanesulfonyloxy (or 21-chloro or bromo) steroid of the pregnane series having a 9-alpha-fluoro and an 11-beta-hydroxy or 11-keto substituent to the corresponding 21-fluoro derivative and, if an 11-beta-hydroxy steroid is employed as the starting material and an 11-keto steroid is desired, oxidizing the latter to the corresponding 11-keto derivative.

The novel compounds of this invention comprise: (A) 21-fluoro-9-beta,11-beta-epoxy steroids of the pregnane series and (B) 21-fluoro-9-alpha-halo-11-beta-hydroxy (or 11-keto) steroids of the pregnane series.

The preferred active steroids preparable by the process of this invention are those which are comprehended by the general formula

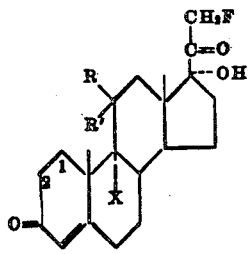

wherein the 1,2-position is saturated or double-bonded, R is hydrogen, R' is beta-hydroxy, or together R and R' is keto, and X is halogen.

The preferred intermediate steroids of this invention, which are utilizable in the preparation of the final active steroids, are those of the general formula

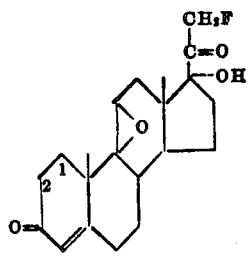

wherein the 1,2-position is saturated or double-bonded.

These intermediate steroids are prepared from the corresponding 21-alkanesulfonyloxy (or chloro or bromo) derivatives of the general formula

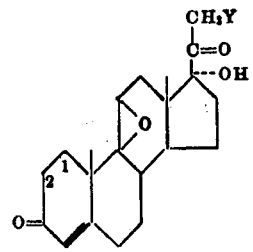

wherein the 1,2-position is saturated or double-bonded and Y is alkanesulifonyloxy (preferably a lower alkanesulfonyloxy such as mesyloxy), chloro or bromo, by reaction thereof with potassium fluoride. This reaction is preferably conducted in an organic solvent of high dielectric constant, such as dimethylformamide or dimethylsulfoxide, optimally at an elevated temperature, a temperature range of 100–130° C. being preferred.

Suitable starting materials utilizable in the first step of this process include: the 21-alkanesulfonic acid esters of 9-beta,11-beta-epoxy-Δ⁴-pregnene - 17 - alpha,21-diol-3,20 - dione (e.g. the 21-mesylate) and 9-beta,11-beta-epoxy-Δ¹,⁴-pregnadiene-17-alpha,21 - diol - 3,20 - dione: 21-chloro-9-beta,11-beta-epoxy-Δ⁴-pregnene - 17 - alpha-ol-3,20-dione; 21-chloro-9-beta,11 - beta - epoxy - Δ¹,⁴-pregnadiene-17-alpha-ol-3,20-dione; 21 - bromo - 9 - beta, 11-beta-epoxy-Δ⁴-pregnene - 17 - alpha - ol - 3,20-dione; and 21-bromo-9-beta,11-beta-epoxy-Δ¹,⁴-pregnadiene - 17-alpha-ol-3,20-dione.

The resultant 21-fluoro-9-beta,11-beta-epoxy steroids are then reacted with a hydrogen halide (i.e. hydrofluoric acid, hydrochloric acid, hydrobromic acid or hydroiodic acid) to yield the corresponding 9-alpha-halo-11-beta-hydroxy steroid derivative. These 11-beta-hydroxy steroids can then be oxidized, if desired, in the usual manner, as by treating with a hexavalent chromium compound (e.g. chromic acid) in an acid medium (e.g. glacial acetic acid) to yield the corresponding 9-alpha-halo-11-keto derivative.

The 9-alpha,21-difluoro compounds of this invention can also be prepared directly from the corresponding 21-alkanesulfonyloxy (or chloro or bromo) derivatives of the general formula

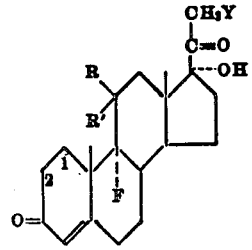

wherein the 1,2-position is saturated or double-bonded, and R, R' and Y are as hereinbefore defined, by reaction thereof with potassium fluoride. This reaction is preferably conducted in an organic solvent of high dielectric constant, such as dimethylformamide or dimethylsulfoxide optimally at an elevated temperature (e.g. 100–130° C.). If the starting steroid contains an 11-beta-hydroxy group, and an 11-keto steroid is the desired final product, the former can be oxidized in the usual manner, as by treatment with chromic acid in glacial acetic acid.

Suitable starting steroids for this alternative of process can be prepared as disclosed in our application Serial No. 516,333, filed June 17, 1955, and include: the 21-alkanesulfonic acid esters of 9-alpha-fluorohydrocortisone (e.g. the 21-mesylate), 9-alpha-fluorocortisone, 9-alpha-fluoro-1-dehydro-hydrocortisone, and 9-alpha-fluoro-1-dehydrocortisone; 9-alpha-fluoro-21-chloro-$\Delta^4$-pregnene-11-beta,17-alpha-diol-3,20-dione; 9-alpha-fluoro-21-chloro-$\Delta^4$-pregnene-17-alpha-ol-3,11,20-trione; 9-alpha-fluoro-21-chloro-$\Delta^{1,4}$-pregnadiene-11-beta,17-alpha-diol-3,20-dione; 9-alpha-fluoro-21-chloro-$\Delta^{1,4}$-pregnadiene-17-alpha-ol-3,11,20-trione; 9-alpha-fluoro-21-bromo-$\Delta^4$-pregnene-11-beta,17-alpha-diol-3,20-dione; 9-alpha-fluoro-21-bromo-$\Delta^4$-pregnene-17-alpha-ol-3,11,20-trione; 9-alpha-fluoro-21-bromo-$\Delta^{1,4}$-pregnadiene-11-beta,17-alpha-diol-3,20-dione; and 9-alpha-fluoro-21-bromo-$\Delta^{1,4}$-pregnadiene-17-alpha-ol-3,11,20-trione.

The 21-fluoro-9-beta,11-beta-epoxides of this invention can also be prepared from the corresponding 21-Y-11-beta-hydroxy derivatives (wherein Y is as hereinbefore defined) by a series of steps comprising reaction of these derivatives with potassium fluoride in an organic solvent of high dielectric constant to yield the corresponding 21-fluoro-11-beta-hydroxy-derivative, treatment of the latter with an alkane sulfonyl chloride (e.g. mesyl chloride) to yield the corresponding 21-fluoro-$\Delta^{9(11)}$-derivative, reaction of this derivative with a bromamide or imide (e.g. N-bromacetamide) to form the corresponding 9-alpha-bromo-21-fluoro-11-beta-hydroxy derivative, and finally treatment of the 9-alpha-bromo compound with a salt of a strong base and weak acid (e.g. potassium acetate) to give the 21-fluoro-9-beta,11-beta-epoxy derivative. The 21-fluoro-$\Delta^{9(11)}$-intermediate can also be formed from the corresponding 11-alpha,21-dihydroxy di(alkanesulfonic acid ester) (e.g. 11-alpha,21-dimesyloxy) derivative by treating the latter with potassium fluoride in an organic solvent of high dielectric constant.

The 21-fluoro-9-alpha-halo-11-beta-hydroxy (or 11-keto) steroids of the pregnane (including the pregnene and pregnadiene) series of this invention are physiologically active steroids which possess glucocorticoid activity. Thus, the new 9-alpha-halo steroids of this invention can be administered instead of, and in the same manner as, cortisone or hydrocortisone in the treatment of rheumatoid arthritis and dermatomyositis. The dosage for such administration is, of course, dependent on the relative activity of the compound.

The following examples are illustrative of the invention (all temperatures being in centigrade):

EXAMPLE 1

*9-alpha,21-difluoro-$\Delta^4$-pregnene-11-beta,17-alpha-diol-3,20-dione*

To a solution of 200 mg. of 9-alpha-fluorohydrocortisone, 21-mesylate in 5 ml. of redistilled dimethylformamide is added 200 mg. of anhydrous potassium fluoride and the resulting suspension heated with stirring at 110° for 18 hours. The mixture is concentrated to small volume, taken up in water and extracted with ethyl acetate. The ethyl acetate extract is in turn extracted with water and the solvent removed in vacuo. The residue is triturated with chloroform and the chloroform-insoluble precipitate recrystallized from 95% alcohol. Pure 9-alpha,21-difluoro-$\Delta^4$-pregnene-11-beta,17-alpha-diol-3,20-dione has the following properties: M.P. about 259–261°; $[\alpha]_D^{23}$ +147° (c., 0.3 in dioxane), +134° (c., 0.53 in acetone);

$\lambda_{max}^{alc.}$ 239 m$\mu$ ($\epsilon$ = 16,400, $\lambda_{max}^{Nujol}$ 2.89$\mu$, 3.04$\mu$, 5.84$\mu$, 6.01–6.05$\mu$

*Analysis.*—Calcd. for $C_{21}H_{28}O_4F_2$ (382.43): C, 65.95; H, 7.38; F, 9.94. Found: C, 65.96; H, 7.43; F, 9.87.

9-alpha,21-difluoro-$\Delta^4$-pregnene-11-beta,17-alpha-diol-3,20-dione possesses about five to seven times the activity of cortisone acetate in the liver glycogen assay.

Upon concentration of the chloroform solution, from which the insoluble 21-fluoro compound has been removed, in vacuo and recrystallization of the residue from 95% ethanol, there is obtained a product having the following properties: M.P. about 272–274°; $[\alpha]_D^{23}$ +162° (c., 0.57 in chloroform);

$\lambda_{max}^{alc.}$ 237 m$\mu$ ($\epsilon$ = 18,300); $\lambda_{max}^{Nujol}$ 3.00$\mu$, 5.55$\mu$, 6.05$\mu$, 6.10$\mu$; 6.19$\mu$

*Analysis.*—Calcd. for $C_{21}H_{27}O_4F$ (362.43): C, 69.61; H, 7.51; F, 5.37. Found: C, 69.77; H, 7.77; F, 5.65.

The procedure of Example 1 can be conducted with dimethylsulfoxide instead of dimethylformamide to give the same results.

EXAMPLE 2

*9-alpha,21-difluoro-$\Delta^{1,4}$-pregnadiene-11-beta,17-alpha-diol-3,20-dione*

To a solution of 217 mg. of 9-alpha-fluoro-$\Delta^{1,4}$-pregnadiene-11-beta,17-alpha,21-triol-3,20-dione 21-mesylate in 10 ml. of dimethylformamide is added 220 mg. of anhydrous potassium fluoride. Reaction conditions are the same as Example 1. The residue from the ethyl acetate extract is triturated with chloroform and the insoluble powder recrystallized from 95% ethanol. The resulting pure 9-alpha,21-difluoro-$\Delta^{1,4}$-pregnadiene-11-beta,17-alpha-diol-3,20-dione has the following properties: M.P. about 281–283°; $[\alpha]_D^{23}$ +115° (c., 0.35 in dioxane);

$\lambda_{max}^{alc.}$ 238 m$\mu$ ($\epsilon$ = 15,500); $\lambda_{max}^{Nujol}$ 3.03$\mu$, 5.75$\mu$, 6.05$\mu$, 6.21$\mu$ 6.26$\mu$

*Analysis.*—Calcd. for $C_{21}H_{26}O_4F_2$ (380.41): C, 66.30; H, 6.79; F, 9.99. Found: C, 65.90; H, 7.17; F, 9.79.

9-alpha,21-difluoro-$\Delta^{1,4}$-pregnadiene-11-beta,17-alpha-diol-3,20-dione possesses about 15 times the activity of cortisone acetate in the rat liver glycogen assay.

From the chloroform filtrate of the above 21-fluoro compound there is isolated by evaporation of the solvent in vacuo and recrystallization from 95% ethanol, a compound of similar structure to that obtained in the second part of Example 1, but containing an additional double bond in the 1,2-position. Its properties are as follows: M.P. about 227–228°; $[\alpha]_D^{23}$+181° (c., 0.47 in chloroform);

$\lambda_{max}^{Nujol}$ 2.95$\mu$, 5.52$\mu$, 6.04$\mu$, 6.17$\mu$, 6.24$\mu$

EXAMPLE 3

*9-alpha,21-difluoro-$\Delta^4$-pregnene-17-alpha-ol-3,11,20-trione*

To a solution of 100 mg. of 9-alpha,21-difluoro-$\Delta^4$-pregnene-11-beta,17-alpha-diol-3,20-dione in 5 ml. of glacial acetic acid is added a solution of 40 mg. of chromic acid in 4 ml. of acetic acid. A half-hour later, 0.5 ml. of methanol is added, and the resulting mixture is concentrated in vacuo. The residue is taken up with water, and extracted with ethyl acetate. After drying over sodium sulfate and evaporation of the solvent in vacuo, the residue is crystallized from 95% ethanol to give pure 9-alpha,21-difluoro-$\Delta^4$-pregnene-17-alpha-ol-3,11,20-trione.

EXAMPLE 4

*9-alpha,21-difluoro-$\Delta^{1,4}$-pregnadiene-17-alpha-ol-3,11,20-trione*

By following the procedure of Example 3, but substituting 9-alpha,21-difluoro-$\Delta^{1,4}$-pregnadiene-11-beta,17-alpha-diol-3,20-dione for the 9-alpha,21-difluoro-$\Delta^4$-pregnene-11-beta,17-alpha-diol-3,20-dione, there is obtained 9-alpha,21-difluoro-$\Delta^{1,4}$-pregnadiene-17-alpha-ol-3,11,20-trione.

EXAMPLE 5

*21-fluoro-9-beta,11-beta-epoxy-$\Delta^4$-pregnene-17-alpha-ol-3-20-dione*

200 mg. of 9-beta,11-beta-epoxy-$\Delta^4$-pregnene-17-alpha,21-diol-3,20-dione 21-mesylate and 200 mg. of anhydrous potassium fluoride are reacted in 12 ml. of freshly distilled dimethylformamide as described in Example 1. Two recrystallizations of the total residue from the ethyl acetate extract from acetone-hexane yields pure 21-fluoro-9-beta,11-beta-epoxy-Δ⁴-pregnene-17-alpha-ol-3,20-dione of the following properties: M.P. about 245–246°; $[\alpha]_D^{23}$ —11.5° (c., 0.37 in acetone);

$\lambda_{max}^{alc.}$ 243 mμ, (ε=15,500); $\lambda_{max}^{Nujol}$ 2.87μ, 5.80μ, 6.10μ

*Analysis.*—Calcd. for $C_{21}H_{27}O_4F$ (362.43): C, 69.59; H, 7.51; F, 5.24. Found: C, 69.50; H, 7.63; F, 5.26.

EXAMPLE 6

*21-fluoro-9-beta,11-beta-epoxy-Δ¹,⁴-pregnadiene-17-alpha-ol-3,20-dione*

Following the procedure of Example 5, by substituting 9-beta,11-beta-epoxy-Δ¹,⁴-pregnadiene-17-alpha,21-diol-3,20-dione 21-mesylate for the mesylate of the example, there is obtained 21-fluoro-9-beta,11-beta-Δ¹,⁴-pregnadiene-17-alpha-ol-3,20-dione.

EXAMPLE 7

*9-alpha-chloro-21-fluoro-Δ⁴-pregnene-11-beta,17-alpha-diol-3,20-dione*

To a solution of 42 mg. of 21-fluoro-9-beta,11-beta-epoxy-Δ⁴-pregnene-17-alpha-ol-3,20-dione in acetone is added, at 0°, 1.8 ml. of 0.5 N hydrochloric acid. After 60 minutes, ice and dilute bicarbonate are added to wash out excess acid; and after separation of the layers, the acetone solution is washed with water, dried over sodium sulfate and evaporated to dryness. The crystalline residue is recrystallized from 95% ethanol to give pure 9-alpha-chloro-21-fluoro-Δ⁴-pregnene-11-beta,17-alpha-diol-3,20-dione.

Similarly, by substituting an equivalent amount of hydrobromic or hydroiodic acid for the hydrochloric acid in the procedure of Example 7, the 9-alpha-bromo and 9-alpha-iodo derivatives, respectively, are prepared.

EXAMPLE 8

*9-alpha-chloro-21-fluoro-Δ¹,⁴-pregnadiene-11-beta,17-alpha-diol-3,20-dione*

Following the procedure of Example 7, but substituting 21-fluoro-9-beta,11-beta-epoxy-Δ¹,⁴-pregnadiene-17-alpha-ol-3,20-dione for the epoxide of the example, there is obtained 9-alpha-chloro-21-fluoro-Δ¹,⁴-pregnadiene-11-beta,17-alpha-diol-3,20-dione.

EXAMPLE 9

*9-alpha-chloro-21-fluoro-Δ⁴-pregnene-17-alpha-ol-3,11,20-trione*

Following the procedure of Example 3 but substituting 9-alpha-chloro-21-fluoro-Δ⁴-pregnene-11-beta,17-alpha-diol-3,20-dione for the steroid reactant in that example, there is obtained 9-alpha-chloro-21-fluoro-Δ⁴-pregnene-17-alpha-ol-3,11,20-trione.

Similarly, 9-alpha-chloro-21-fluoro-Δ¹,⁴-pregnadiene-11-beta,17-alpha-diol-3,20-dione; 9-alpha-bromo-21-fluoro-Δ⁴-pregnene-11-beta,17-alpha-diol-3,20-dione; and 9-alpha-iodo-21-fluoro-Δ⁴-pregnene-11-beta,17-alpha-diol-3,20-dione can be converted to 9-alpha-chloro-21-fluoro-Δ¹,⁴-pregnadiene-17-alpha-ol-3,11,20-trione; 9-alpha-bromo-21-fluoro-Δ⁴-pregnene-17-alpha-ol-3,11,20-trione; and 9-alpha-iodo-21-fluoro-Δ⁴-pregnene-17-alpha-ol-3,11,20-trione, respectively.

The invention may be variously otherwise embodied within the scope of the appended claims.

We claim:

1. A steroid of the general formula

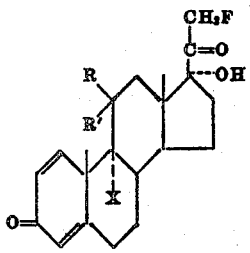

wherein R is hydrogen, R' is beta-hydroxy, and together R and R' is keto, and X is halogen.

2. 9-alpha-halo-21-fluoro-Δ¹,⁴-pregnadiene-11-beta,17-alpha-diol-3,20-dione.

3. 21-fluoro-9-beta,11-beta-epoxy-Δ⁴-pregnene-17-alpha-ol-3,20-dione.

4. 21-fluoro-9-beta,11-beta-epoxy-Δ¹,⁴-pregnadiene-17-alpha-ol-3,20-dione.

5. A steroid selected from the group consisting of 21-fluoro-9β,11β-epoxy-Δ⁴-pregnene-17α-ol-3,20-dione and 21-fluoro-9β,11β-epoxy-Δ¹,⁴-pregnadiene-17α-ol-3,20-dione.

6. 9α,21-difluoro-Δ¹,⁴-pregnadiene-11β,17α-diol-3,20-dione.

7. 9α,21-difluoro-Δ¹,⁴-pregnadiene-17α-ol-3,11,20-trione.

8. 9α-chloro-21-fluoro-Δ¹,⁴-pregnadiene-11β,17α-diol-3,20-dione.

References Cited in the file of this patent

UNITED STATES PATENTS

| | | |
|---|---|---|
| 2,684,968 | Bergstrom | July 27, 1954 |
| 2,713,587 | Bergstrom | July 19, 1955 |
| 2,734,065 | Hogg | Feb. 7, 1956 |
| 2,763,671 | Fried et al. | Sept. 18, 1956 |
| 2,768,191 | Warnant | Oct. 23, 1956 |
| 2,852,511 | Fried | Sept. 16, 1958 |
| 2,875,200 | Hogg et al. | Feb. 24, 1959 |